United States Patent

Matsuura

[11] 4,188,143
[45] Feb. 12, 1980

[54] DEVICE FOR RETAINING SCAFFOLD MEMBER

[76] Inventor: Norio Matsuura, 10-16 Minoo 6 chome, Minoo City, Osaka 562, Japan

[21] Appl. No.: 933,057

[22] Filed: Aug. 11, 1978

[30] Foreign Application Priority Data

Apr. 5, 1978 [JP] Japan ................ 53/40562

[51] Int. Cl.² .................................................. E04G 7/00
[52] U.S. Cl. ..................................... 403/49; 403/317
[58] Field of Search ............... 403/49, 315, 316, 317, 403/318, 326, 327, 329, 330

[56] References Cited

U.S. PATENT DOCUMENTS

| | | | |
|---|---|---|---|
| 2,836,468 | 5/1958 | Jaigiel | 403/49 |
| 2,847,259 | 8/1958 | Beatty | 403/49 X |
| 3,091,485 | 5/1963 | Jackson | 403/49 |

FOREIGN PATENT DOCUMENTS 756962  4/1967  Canada ........................ 403/49

*Primary Examiner*—Wayne L. Shedd
*Attorney, Agent, or Firm*—Hubbard, Thurman, Turner, Tucker & Glaser

[57] ABSTRACT

A device comprising a straight rod portion with a mounting pin extending from its one end and having a smaller diameter than the rod portion, a pivotable member fitting over the mounting pin, and an abutment provided at the forward end of the mounting pin for preventing the pivotable member from slipping off the pin. The pivotable member includes two side plates extending substantially over the entire length thereof with the pin positioned therebetween and a forward end annular portion loosely fitting around the mounting pin.

4 Claims, 9 Drawing Figures

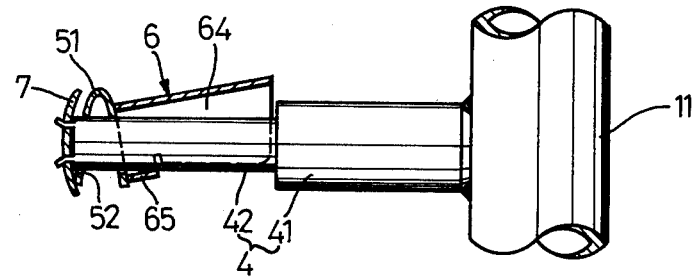
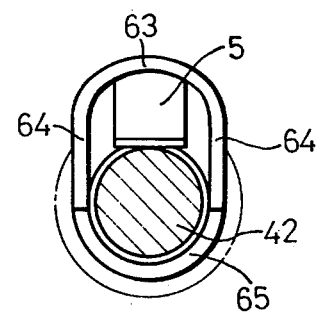 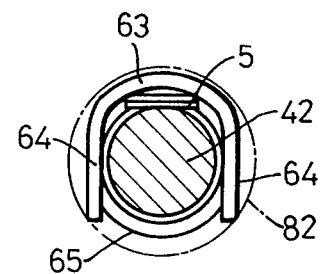
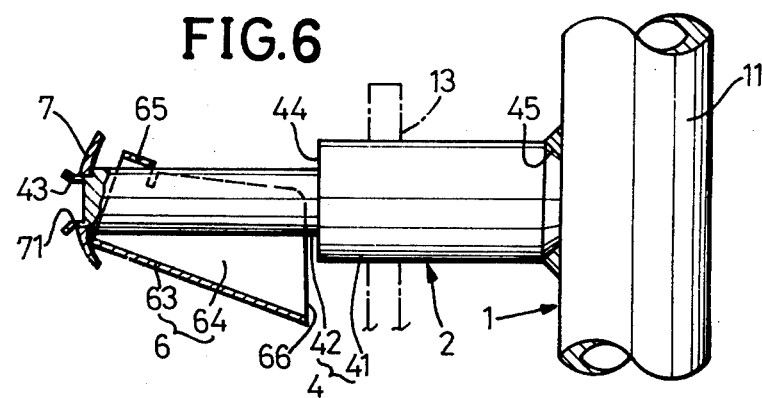

DEVICE FOR RETAINING SCAFFOLD MEMBER

BACKGROUND OF THE INVENTION

With reference to FIG. 1, scaffolds of steel usually comprise two frames 1 formed from vertical poles 11 and horizontal rods 12, and connecting members 13 arranged crosswise between the frames 1 and detachably held thereto. The vertical poles 11 are provided with retaining devices 2 for retaining the ends of the connecting members 13 thereon.

The retaining device 2 must be so adapted that the connecting member 13, once mounted thereon, can be held in place during usual use but is still easily detachable therefrom when disassembling the scaffold. FIGS. 7 and 8 show conventional retaining devices which fulfil the above requirement.

The retaining device 2a shown in FIG. 7 comprises a rod portion 41 having a base end to be secured to the main frame 1 and a forward end formed with a groove 3. A pivotable plate 31 fitted in the groove 3 is supported by a pin 32 at a position slightly away from its center of gravity toward the base end of the plate 31. The rod portion 41 is welded at its base end to the main frame 1 with the groove 3 positioned in parallel to a vertical plane.

Accordingly the pivotable plate 31 is at right angles with the rod portion 41 with its forward end always facing down under gravity. When holding the connecting member 13, the forward end of the pivotable plate 31 is raised to align the plate 31 with the rod portion 41, and the connecting member 13 is placed onto the rod portion 41 through an end hole 14. When the connecting member 13 has fitted to the rod portion 41 over the groove 3, the pivotable plate 31 returns to its original position under gravity, preventing the member 13 from slipping off the rod portion.

The retaining device 2b shown in FIG. 8 comprises a hollow rod portion 41 to be secured to the frame 1 and formed with an axial slit 33. A pawl plate 34 fitted in the slit 33 is projectable from and retractable into the rod portion. On one side of the rod portion opposite to the slit 33, the rod portion is indented from outside to provide a stopper 35 for the pawl plate 34 for preventing the plate from slipping off. A leaf spring 5 housed in the rod portion 41 biases the pawl plate 34 outward. The rod portion 41 is welded at its base end to the frame 1.

To mount the connecting member 13 on the device 2b, the member 13 is passed over the forward end of the rod portion 41 through a hole 14 of the member 13 and forced toward the base end of the rod portion 41. The pawl plate 34 therefore retracts into the portion 41 against the spring 5 and thereafter returns upon the member 13 passing over the pawl plate 34, preventing the connecting member 13 from slipping off.

Although the two retaining devices 2a and 2b have the advantage that the connecting member 13 is easily mountable on and detachable from the rod portion, they are difficult and expensive to make since the groove 3 and slit 33 must be formed by machining as by milling. The former device, in which the pivotable plate 31 is adapted to be raised to an upright position by the force of gravity, involves the necessity of welding the rod portion to the frame 1 with the groove 3 in parallel to a vertical plane. This procedure requires care and is cumbersome.

With the latter device, the rod portion having the pawl plate 34 fitted in the slit 33 must be indented from outside with a chisel to form the stopper 35 on one side thereof opposed to the slit 33. This procedure is difficult to follow.

Further when the frame 1 provided with retaining devices 2a or 2b is subjected to hot dipping or coating operation for the inhibition of corrosion, the operation entails the problem that the molten metal or coating composition ingressing into a clearance between the plate 31 or 34 and the cutout portion 3 or 33 solidifies, restraining the plate 31 or 34 against pivotal movement.

SUMMARY OF THE INVENTION

An object of this invention is to provide a retaining device which comprises a rod portion with a mounting pin of reduced diameter extending from one end of the rod portion and a pivotable member turnably fitting around the pin and which is therefore easily attachable to a vertical pole of scaffolds.

Another object of this invention is to provide a retaining device on which a scaffold connecting member is easily detachably mountable and which reliably retains the connecting member thereon against inadvertent slipping off.

BRIEF DESCRIPTION OF THE DRAWINGS

FIG. 4 is a view in section taken along the line IV—IV in FIG. 2;

FIG. 5 is a sectional view showing the pevotable member of FIG. 4 in its depressed position;

FIGS. 6 and 9 are views in vertical section showing another retaining device embodying this invention.

DETAILED DESCRIPTION OF THE INVENTION

Figure 1:
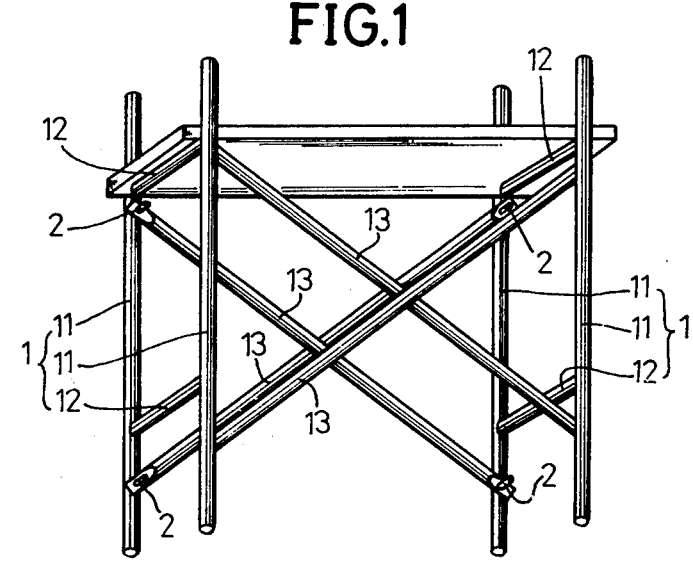
FIG. 1 is a perspective view showing retaining devices of this invention as used on a scaffold.
Figure 2:
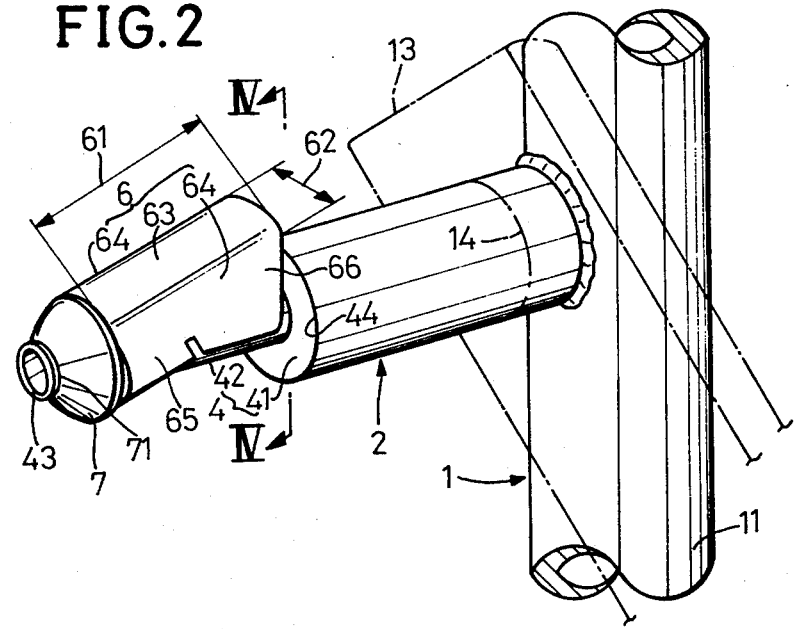
FIG. 2 is a perspective view showing a retaining device according to this invention.

FIG. 2 shows a retaining device 2 of this invention as attached to a vertical pole 11 of the frame 1. The device 2 comprises a main body 4 to be welded to the vertical pole 11, a pivotable member 6 turnably fitting around the main body 4, and an abutment 7 for preventing the pivotable member 6 from slipping off the main body 4.

The device main body 4 includes a straight round rod portion 41 for mounting thereon a connecting member 13 through an end hole of the member 13. The rod portion 41 has a base end with a chamfer 45 for welding and a forward end from which a mounting pin 42 having a smaller diameter than the rod portion 41 extends in alignment with the portion 41. The mounting pin 42 is formed with a small circular crimping wall 43 projecting from its forward end.

The main body 4 can be shaped from a round rod by cutting or from linear material by a punch press or multi-stage press machine.

The pivotable member 6 is fitted over the mounting pin 42 of the main body 4 as if covering the pin and includes a semicircular curved portion 63 and side plates 64 extending in parallel to each other from the opposite sides of the curved portion 63. The curved portion 63 has a length 61 approximately equal to the length of the mounting pin 42 and a width 62 approximately equal to the diameter of the mounting pin 42. The pivotable member 6 includes at its forward end an elliptical annular portion 65 loosely fitting around the pin 42 and formed by inwardly bending the side plates 64 around the pin 42 and welding the bent lower plate portions end-to-end.

A leaf spring 5 provided inside the curved portion 63 has one end secured to the forward end of the portion 63 and the other end bearing against the mounting pin 42 to bias the pivotable member 6 away from the pin, the member 6 being supported at its annular portion 65.

The side plates 64 have a height increasing from the annular portion 65 toward the rod portion 41 and are so dimensioned that when the free end of the curved portion 63 is the greatest distance away from the mounting pin 42 under the action of the spring 5, the edges 66 of the side plates 64 opposed to the rod portion 41 will be at right angles to the mounting pin 42.

Figure 3:
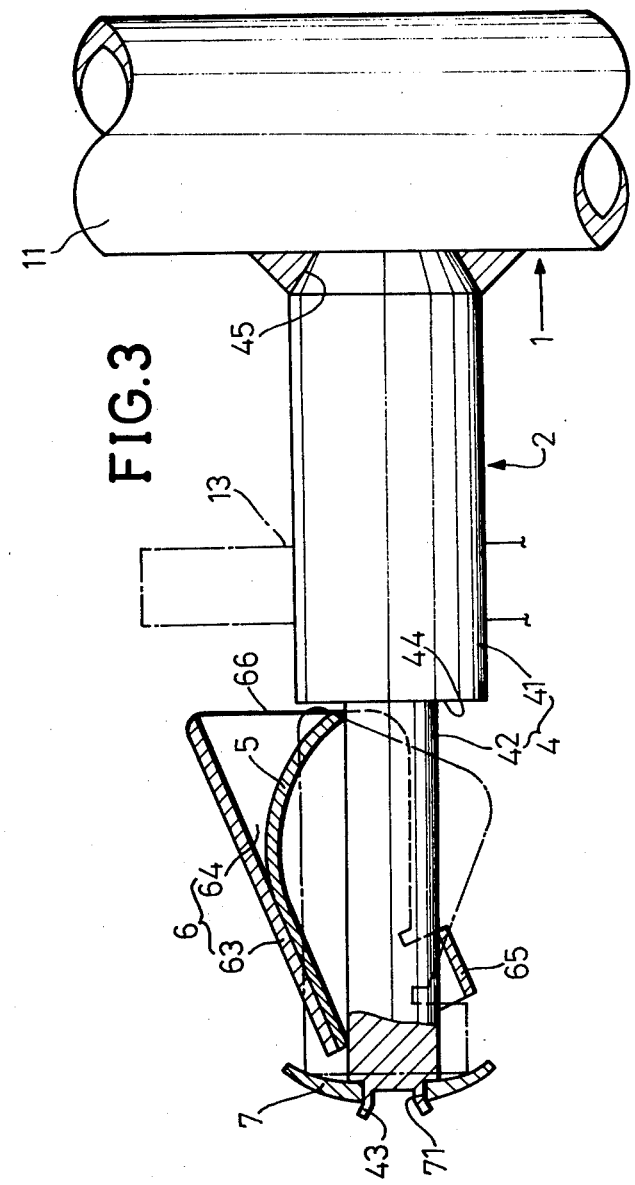
FIG. 3 is a view partly in vertical section of the retaining device.
Figure 7:
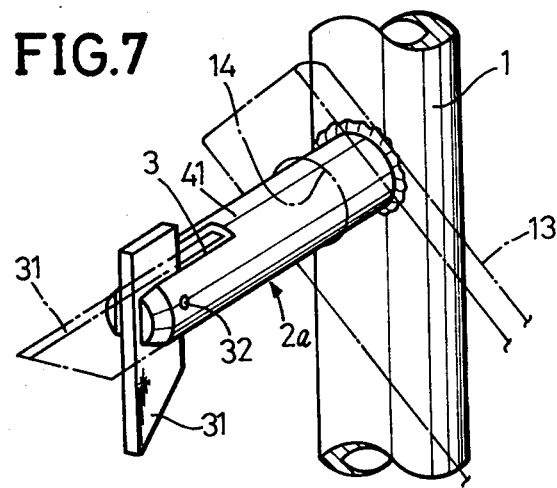
FIGS. 7 and 8 are perspective views showing conventional retaining devices respectively.
Figure 8:
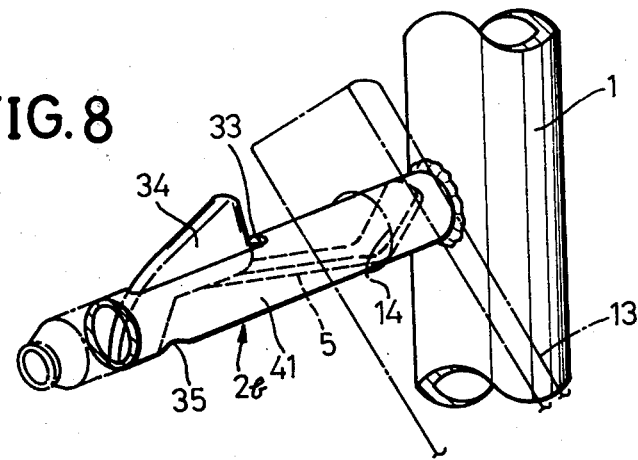

The pivotable member 6 has such dimensions that when depressed on the curved portion 63 toward the mounting pin 42 against the spring 5, the member 6 is positioned within a space 82 having the same diameter as the rod portion 41 of the device main body 4 as indicated by the dot-and-dash line in FIGS. 3 and 5.

The pivotable member 6 can be made from a plate of corrosion resistant metal such as stainless steel by blanking out a piece of desired shape by a press, bending the piece to form the curved portion 63, side plates 64 and annular portion 65 and completing the annular portion 65 by welding.

The abutment 7 for preventing the pivotable member 6 from slipping off the mounting pin 42 is in the form of a spherical disk made as by press work and having a diameter slightly larger than the largest diameter of the annular portion 65 of the pivotable member 6. The abutment 7 has an apertured portion 71 in its center fittable around the circular wall 43 at the forward end of the mounting pin portion 42.

To secure the retaining device 2 to the frame 1, the device main body 4 is welded at its base end to the desired portion of the frame 1. The resulting assembly is then subjected to hot dipping or coated.

Subsequently the pivotable member 6 is mounted on the pin 42 with the annular portion 65 positioned on the forward end of the pin 42. The abutment 7 is fitted around the circular wall 43 on the forward end of the pin 42 with the concave inner face of the abutment facing the annular portion 65 of the pivotable member 6. The circular wall 43 is crimped to fasten the abutment 7.

When the pivotable member 6 is mounted on the main body 4 after the frame 1 having the main body 4 alone attached thereto has been plated or coated, the pivotable member 6 is smoothly movable against the force of spring 5 when pressed down by hand, free of the conventional objection that the deposition of the molten plating metal or coating composition in the clearance between the pin 42 and the member 6 will hamper the movement of the member 6. Since the pivotable member 6 is held to the mounting pin 42 by the annular portion 65 loosely fitting around the pin 42 and by the force of the spring 5, the pivotable member 6 is turnable to and retainable in any desired position on the pin 42.

To connect a connecting member 13 to the frame 1, the member 13 is fitted at its hole 14 to the forward end of the retaining device 2 and pushed toward the other end thereof. Since the abutment 7 at the forward end of the device 2 is curved toward the direction in which the member 13 is pushed, the member 13 is smoothly placeable on the device. The connecting member 13 passes over the abutment 7 and pushes the curved portion 63 of the pivotable member 6, bringing the free end edges 66 of the side plates 64 of the member 6 into contact with the end face 44 of the rod portion 41. A further push on the connecting member 13 pivotally retracts the member 6 with its edges 66 in contact with the end face 44, permitting the passage of the connecting member 13 over the pivotable member 6.

When the connecting member 13 has come into fitting engagement with the rod portion 41 over the pivotable member 6, the member 6 returns under the action of the spring 5. The connecting member 13, once fitted onto the rod portion 41, will be restrained by the pivotable member 6 from slipping off even when subjected to a force acting to push the member 13 toward the pin 42.

To separate the connecting member 13 from the frame 1, the pivotable member 6 of the device 2 is depressed by hand toward the pin 42 and thereby retracted into the space 82 defined by an imaginary extension of the outer periphery of the rod portion 41. With the pivotable member 6 held in its retracted position, the connecting member 13 is readily detachable from the device 2 by being pulled outward axially of the device.

Modified Embodiment

Another embodiment of the construction shown in FIG. 6 is also useful for retaining a scaffold member. The modified embodiment has the same construction as the embodiment of FIGS. 2 to 5 except that the leaf spring 5 has been eliminated. The pivotable member 6 suspends from the mounting pin 42 under gravity with the curved portion 63 facing down. When mounting the connecting member 13, the curved portion 63 is brought close to the mounting pin 42 as in the first embodiment, permitting the passage of the member 13. When the member 13 has been fitted onto the rod portion 41, the pivotable member 6 is lowered again by the force of gravity, preventing the member 13 from slipping off.

FIG. 9 shows another modification of the invention, having V shaped spring 51 in place of leaf spring 5, between abntment 7 and the annular portion 65 of the pivotable member 6. The V shaped spring 51 has two openings 52 to be inserted to the mounting pin 42.

The scope of this invention is not limited to the foregoing description and the disclosure of the drawings. Various modifications may be easily made by one skilled in the art without departing from the spirit of the invention. Such modifications are therefore included within the scope of the invention.

I claim:
1. A device for retaining a scaffold member comprising:
   a main body including a rod portion and a mounting pin extending from the forward end of the rod portion and having a circular section of a smaller diameter than the rod portion,
   a retractable pivotable member rotatably fitting over and covering the mounting pin, the pivotable member including a semicircular curved portion having approximately the same length as the mounting pin, an annular portion integral with the forward end of the curved portion and loosely fitting around the mounting pin and a pair of parallel side plates extending from the opposite sides of the curved por- tion with the pin interposed between the side plates, and an abutment provided at the forward end of the mounting pin for preventing the pivotable member from slipping off the pin.

2. A retaining device as defined in claim 1 wherein each of the side plates has a width increasing from its one end near the annular portion toward the other end near the rod portion, the largest width of the pivotable member being not larger than the diameter of the rod portion.

3. A retaining device as defined in claim 1 wherein a leaf spring is provided between the mounting pin and the curved portion of the pivotable member to bias the free end of the pivotable member away from the pin.

4. A retaining device as defined in claim 1 wherein a V shaped spring is provided between the abutment and the annular portion of the pivotable member to bias the free end of the pivotable member away from the pin.

* * * * *